(12) United States Patent
Kumar et al.

(10) Patent No.: US 10,769,414 B2
(45) Date of Patent: Sep. 8, 2020

(54) ROBUST FACE DETECTION

(71) Applicant: Apple Inc., Cupertino, CA (US)

(72) Inventors: Atulit Kumar, Cupertino, CA (US); Thorsten Gernoth, San Francisco, CA (US); Feng Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 74 days.

(21) Appl. No.: 16/119,842

(22) Filed: Aug. 31, 2018

(65) Prior Publication Data

US 2019/0370529 A1    Dec. 5, 2019

Related U.S. Application Data

(60) Provisional application No. 62/679,850, filed on Jun. 3, 2018.

(51) Int. Cl.
*G06K 9/00* (2006.01)
*G06T 7/73* (2017.01)

(52) U.S. Cl.
CPC ..... *G06K 9/00255* (2013.01); *G06K 9/00241* (2013.01); *G06K 9/00275* (2013.01); *G06K 9/00288* (2013.01); *G06T 7/74* (2017.01); *G06T 2207/30201* (2013.01)

(58) Field of Classification Search
None
See application file for complete search history.

(56) References Cited

U.S. PATENT DOCUMENTS

| | | | |
|---|---|---|---|
| 7,237,919 B2 | 7/2007 | Uomori et al. | |
| 7,469,060 B2 | 12/2008 | Bazakos et al. | |
| 7,969,436 B1 * | 6/2011 | Greene | G06T 15/405 |
| | | | 345/419 |
| 8,150,142 B2 | 4/2012 | Freedman et al. | |
| 8,384,997 B2 | 2/2013 | Shpunt et al. | |
| 8,749,796 B2 | 6/2014 | Pesach et al. | |
| 8,913,839 B2 | 12/2014 | Ricanek, Jr. et al. | |
| 9,721,150 B2 | 8/2017 | Gottemukkula et al. | |
| 9,836,643 B2 | 12/2017 | Saripalle et al. | |

(Continued)

FOREIGN PATENT DOCUMENTS

| DE | 202018000408 U1 | 5/2018 |
|---|---|---|
| WO | 2017015390 A1 | 1/2017 |

OTHER PUBLICATIONS

ISR/WO, PCT/US2019/033364, mailed Aug. 30, 2019, 20 pages.

(Continued)

*Primary Examiner* — Hadi Akhavannik
(74) *Attorney, Agent, or Firm* — Kowert, Hood, Munyon, Rankin & Goetzel, P.C.; Gareth M. Sampson

(57) ABSTRACT

A neural network may implement a face detection process on a mobile device or computer system. An image captured using a camera on the device may be processed using the face detection process. The face detection process may provide a bounding box for the face detected in the image. The face detected in the image may have any orientation. The face detected in the image may include either a whole face of the user or only a partial face of the user. The face detection process may provide face detection that is substantially invariant to exposure in the captured image. The face may also be detected over a wide range of distances between the camera and the face of the user.

20 Claims, 9 Drawing Sheets

(56) References Cited

U.S. PATENT DOCUMENTS

| | | | |
|---|---|---|---|
| 2005/0027646 | A1 | 12/2005 | Kim |
| 2008/0023265 | A1 | 9/2008 | Woo |
| 2008/0279423 | A1* | 11/2008 | Zhang ................ G06K 9/00268 382/118 |
| 2013/0247175 | A1 | 9/2013 | Nechyba et al. |
| 2014/0029859 | A1 | 1/2014 | Libin |
| 2016/0026253 | A1 | 1/2016 | Bradski et al. |
| 2016/0178915 | A1 | 6/2016 | Mor et al. |
| 2016/0377417 | A1 | 12/2016 | Jovanovski et al. |
| 2017/0007120 | A1 | 1/2017 | Shudo |
| 2017/0344807 | A1 | 11/2017 | Jillela et al. |

OTHER PUBLICATIONS

Changzheng Zhang et al. : "Face Detection Using Improved Faster RCNN", arxiv.org, Cornell University Library, 201 Olin Library Cornell University, Ithaca, NY 14853, Feb. 6, 2018 (Feb. 6, 2018), XP081219368.

Ahuja N et al., "Detecting faces in images: a survey", IEEE Transactions on Pattern Analysis and Machine Intelligence, IEEE Computer Society, USA, vol. 24, No. 1, Jan. 2002 (Jan. 2002), pp. 34-58, XP011094133, ISSN: 0162-8828, DOI:10.1109/34.982883.

U.S. Appl. No. 15/910,551, filed Mar. 2, 2018, Gernoth et al.

U.S. Appl. No. 15/912,917, filed Mar. 6, 2018, Gernoth et al.

Seung Min Choi et al., "Dense 3D depth map with DOE pattern,"Ubiquitous Robots and Ambient Intelligence (URAI), 2012 9th International Conference ON, IEEE, Nov. 26, 2012, pp. 34037.

Ming-Yuan Shieh et al., "Fast Facial Detection by Depth Map Analysis," Mathematical Problems in Engineering, vol. 2013, Nov. 1, 2013, pp. 1-10.

Du Pei-Qin et al., "Design and verification of diffractive optical elements for speckle generation of 3-D range senors," Optical Review, Springer Verlag, Tokyo, JP vol. 23, No. 6, pp. 1017-1025.

Anurag Chowdhury: "RGB-D Face Recognition in Surveillance Videos," Jun. 23, 2016, 70 pages.

Everingham, M. et al., "Taking the bite out of automated naming of characters in TV video," Image and Vision Computing 27 (2009) 545-559, 16 pages.

Mei Wang et al., "Deep Face Recognition: Survey," School of Information ans Communication Engineering, Beijing University of Posts and Telecommunications, Beijing, China, Apr. 24, 2018, 18 pages.

Xi Peng et al., "Reconstruction for Feature Disentanglement in Pose-invariant Face Recognition," Feb. 10, 2017, Department of Computer Science, Rutgers University, NJ, USA, 10 pages.

\* cited by examiner

ROBUST FACE DETECTION

PRIORITY CLAIM

This patent claims priority to U.S. Provisional Patent Application No. 62/679,850 to Kumar et al., entitled "ROBUST FACE DETECTION", filed Jun. 3, 2018, which is incorporated by reference in their entirety.

BACKGROUND

1. Technical Field

Embodiments described herein relate to methods and systems for face detection in images capture by a camera on a device. More particularly, embodiments described herein relate to the use of neural networks in detecting faces in captured images.

2. Description of Related Art

Facial recognition processes may generally be used to identify individuals in an image. Face detection may be used to detect faces in an image for use in the facial recognition process. Face detection processes, however, are often limited in detecting faces in only certain situations. For example, current face detection processes typically only detect faces in certain orientations (e.g., upright (normal) portrait or landscape modes). Images may often be rotated based on other sensor data to provide upright pictures for face detection, which can be unreliable and processor intensive.

Current face detection processes also typically reject an image for face detection (and downstream processes) if only part of a face is detected in the image. Such images are often rejected because the face detection is not reliable in detecting partial faces. Face detection processes are also often limited in providing face detection in challenging lighting conditions (low light and/or bright light conditions). The distance between the face of the user and the camera may also adversely affect the effectiveness of the face detection process.

SUMMARY

A neural network on a device may implement a face detection process on an image captured using a camera on the device (e.g., a mobile device or computer system). The face detection process may assess if a face is in the image and, if a face is detected, provide a bounding box for the face in the image. The face detection process may provide face detection for any orientation of the face in the image (e.g., the face is detected regardless of the orientation of the face in the image). Additionally, the face detection process may provide face detection for images that include either the user's entire face or only a portion of the user's face. The bounding box may also be located for an entire face or only the partial face present in the image.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
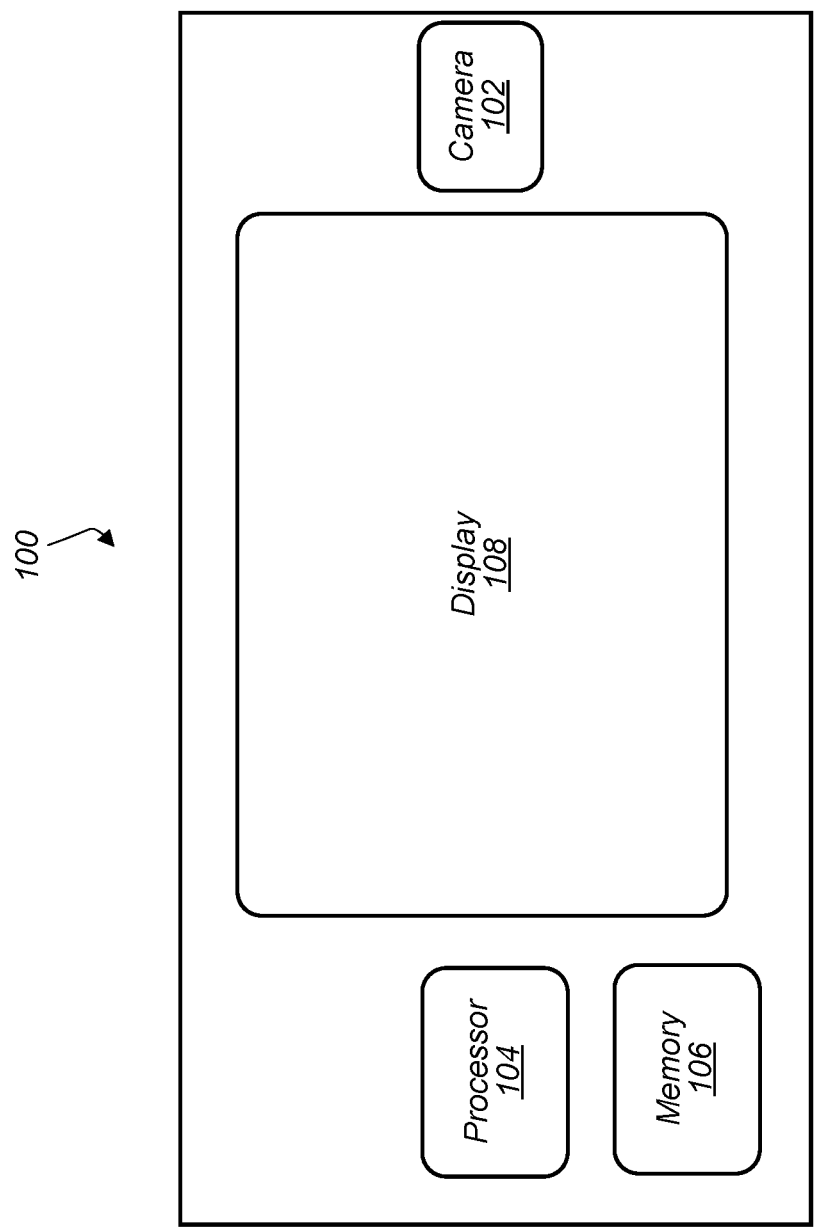
FIG. 1 depicts a representation of an embodiment of a device including a camera.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. The hardware circuits may include any combination of combinatorial logic circuitry, clocked storage devices such as flops, registers, latches, etc., finite state machines, memory such as static random access memory or embedded dynamic random access memory, custom designed circuitry, programmable logic arrays, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

As described herein, one aspect of the present technology is the gathering and use of data available from various sources to improve the operation and access to devices. The present disclosure contemplates that in some instances, this gathered data may include personal information data that uniquely identifies or can be used to contact or locate a specific person. Such personal information data can include image data (e.g., data from images of the user), demographic data, location-based data, telephone numbers, email addresses, home addresses, or any other identifying information. For image data, the personal information data may only include data from the images of the user and not the images themselves.

The present disclosure recognizes that the use of such personal information data, in the present technology, can be used to the benefit of users. For example, the personal information data can be used to control unlocking and/or authorizing devices using facial recognition. Accordingly, use of such personal information data enables calculated control of access to devices. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, in the case of unlocking and/or authorizing devices using facial recognition, personal information from users should be collected for legitimate and reasonable uses of the entity, as such uses pertain only to operation of the devices, and not shared or sold outside of those legitimate uses. Further, such collection should occur only after receiving the informed consent of the users and the personal information data should remain secured on the devices on which the personal information is collected. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services.

FIG. 1 depicts a representation of an embodiment of a device including a camera. In certain embodiments, device 100 includes camera 102, processor 104, memory 106, and display 108. Device 100 may be a small computing device, which may be, in some cases, small enough to be handheld (and hence also commonly known as a handheld computer or simply a handheld). In certain embodiments, device 100 is any of various types of computer systems devices which are mobile or portable and which perform wireless communications using WLAN communication (e.g., a "mobile device"). Examples of mobile devices include mobile telephones or smart phones, and tablet computers. Various other types of devices may fall into this category if they include wireless or RF communication capabilities (e.g., Wi-Fi, cellular, and/or Bluetooth), such as laptop computers, portable gaming devices, portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using, for example, WLAN, Wi-Fi, cellular, and/or Bluetooth. In certain embodiments, device 100 includes any device used by a user with processor 104, memory 106, and display 108. Display 108 may be, for example, an LCD screen or touchscreen. In some embodiments, display 108 includes a user input interface for device 100 (e.g., the display allows interactive input for the user).

Figure 2:
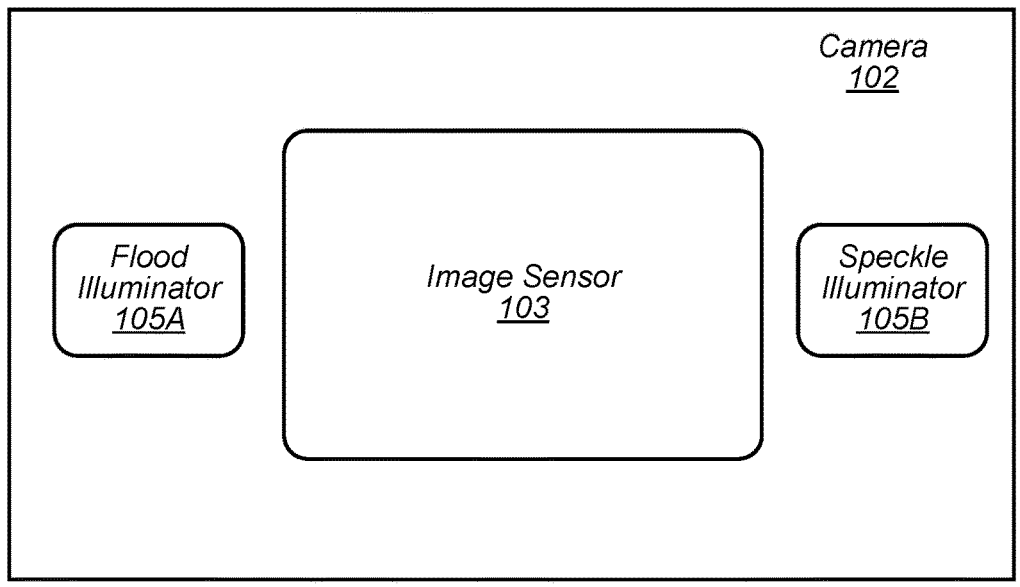
FIG. 2 depicts a representation of an embodiment of a camera.

Camera 102 may be used to capture images of the external environment of device 100. In certain embodiments, camera 102 is positioned to capture images in front of display 108. Camera 102 may be positioned to capture images of the user (e.g., the user's face) while the user interacts with display 108. FIG. 2 depicts a representation of an embodiment of camera 102. In certain embodiments, camera 102 includes one or more lenses and one or more image sensors 103 for capturing digital images. Digital images captured by camera 102 may include, for example, still images, video images, and/or frame-by-frame images.

In certain embodiments, camera 102 includes image sensor 103. Image sensor 103 may be, for example, an array of sensors. Sensors in the sensor array may include, but not be limited to, charge coupled device (CCD) and/or complementary metal oxide semiconductor (CMOS) sensor elements to capture infrared images (IR) or other non-visible electromagnetic radiation. In some embodiments, camera 102 includes more than one image sensor to capture multiple types of images. For example, camera 102 may include both IR sensors and RGB (red, green, and blue) sensors. In certain embodiments, camera 102 includes illuminators 105 for illuminating surfaces (or subjects) with the different types of light detected by image sensor 103. For example, camera 102 may include an illuminator for visible light (e.g., a "flash illuminator), illuminators for RGB light, and/or illuminators for infrared light (e.g., a flood IR source and a speckle pattern projector). In some embodiments, the flood IR source and speckle pattern projector are other wavelengths of light (e.g., not infrared). In certain embodiments, illuminators 105 include an array of light sources such as, but not limited to, VCSELs (vertical-cavity surface-emitting lasers). In some embodiments, image sensors 103 and illuminators 105 are included in a single chip package. In some embodiments, image sensors 103 and illuminators 105 are located on separate chip packages.

In certain embodiments, image sensor 103 is an IR image sensor and the image sensor is used to capture infrared images used for face detection, facial recognition authentication, and/or depth detection. Other embodiments of image sensor 103 (e.g., an RGB image sensor) may also be contemplated for use in face detection, facial recognition authentication, and/or depth detection as described herein. For face detection, illuminator 105A may provide flood IR illumination to flood the subject with IR illumination (e.g., an IR flashlight) and image sensor 103 may capture images of the flood IR illuminated subject. Flood IR illumination images may be, for example, two-dimensional images of the subject illuminated by IR light. For depth detection or generating a depth map image, illuminator 105B may provide IR illumination with a speckle pattern. The speckle pattern may be a pattern of light spots (e.g., a pattern of dots) with a known, and controllable, configuration and pattern projected onto a subject. Illuminator 105B may include a VCSEL array configured to form the speckle pattern or a light source and patterned transparency configured to form the speckle pattern. The configuration and pattern of the speckle pattern provided by illuminator 105B may be selected, for example, based on a desired speckle pattern density (e.g., dot density) at the subject. Image sensor 103 may capture images of the subject illuminated by the speckle pattern. The captured image of the speckle pattern on the subject may be assessed (e.g., analyzed and/or processed) by an imaging and processing system (e.g., an image signal processor (ISP) as described herein) to produce or estimate a three-dimensional map of the subject (e.g., a depth map or depth map image of the subject). Examples of depth map imaging are described in U.S. Pat. No. 8,150,142 to Freedman et al., U.S. Pat. No. 8,749,796 to Pesach et al., and U.S. Pat. No. 8,384,997 to Shpunt et al., which are incorporated by reference as if fully set forth herein, and in U.S. Patent Application Publication No. 2016/0178915 to Mor et al., which is incorporated by reference as if fully set forth herein.

In certain embodiments, images captured by camera 102 include images with the user's face (e.g., the user's face is included in the images). An image with the user's face may include any digital image with at least some portion of the user's face shown within the frame of the image. Such an image may include just the user's face or may include the user's face in a smaller part or portion of the image. The user's face may be captured with sufficient resolution in the image to allow image processing of one or more features of the user's face in the image.

Figure 3:
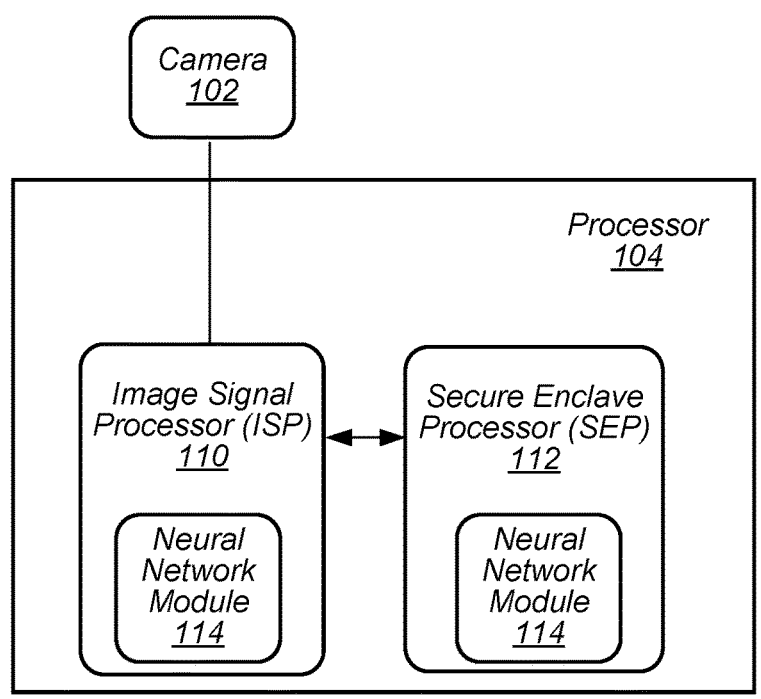
FIG. 3 depicts a representation of an embodiment of a processor on a device.

Images captured by camera 102 may be processed by processor 104. FIG. 3 depicts a representation of an embodiment of processor 104 included in device 100. Processor 104 may include circuitry configured to execute instructions defined in an instruction set architecture implemented by the processor. Processor 104 may execute the main control software of device 100, such as an operating system. Generally, software executed by processor 104 during use may control the other components of device 100 to realize the desired functionality of the device. The processors may also execute other software. These applications may provide user functionality, and may rely on the operating system for lower-level device control, scheduling, memory management, etc.

In certain embodiments, processor 104 includes image signal processor (ISP) 110. ISP 110 may include circuitry suitable for processing images (e.g., image signal processing circuitry) received from camera 102. ISP 110 may include any hardware and/or software (e.g., program instructions) capable of processing or analyzing images captured by camera 102.

In certain embodiments, processor 104 includes secure enclave processor (SEP) 112. In some embodiments, SEP 112 is involved in a facial recognition authentication process involving images captured by camera 102 and processed by ISP 110. SEP 112 may be a secure circuit configured to authenticate an active user (e.g., the user that is currently using device 100) as authorized to use device 100. A "secure circuit" may be a circuit that protects an isolated, internal resource from being directly accessed by an external circuit. The internal resource may be memory (e.g., memory 106) that stores sensitive data such as personal information (e.g., biometric information, credit card information, etc.), encryptions keys, random number generator seeds, etc. The internal resource may also be circuitry that performs services/operations associated with sensitive data. As described herein, SEP 112 may include any hardware and/or software (e.g., program instructions) capable of authenticating a user using the facial recognition authentication process. The facial recognition authentication process may authenticate a user by capturing images of the user with camera 102 and comparing the captured images to previously collected images of an authorized user for device 100. In some embodiments, the functions of ISP 110 and SEP 112 may be performed by a single processor (e.g., either ISP 110 or SEP 112 may perform both functionalities and the other processor may be omitted).

In certain embodiments, processor 104 performs an enrollment process (e.g., an image enrollment process or a registration process) to capture (e.g., the previously collected images) for an authorized user of device 100. During the enrollment process, camera module 102 may capture (e.g., collect) images and/or image data from an authorized user in order to permit SEP 112 (or another security process) to subsequently authenticate the user using the facial recognition authentication process. In some embodiments, the images and/or image data (e.g., feature vector data from the images) from the enrollment process are used to generate templates in device 100. The templates may be stored, for example, in a template space in memory 106 of device 100. In some embodiments, the template space may be updated by the addition and/or subtraction of templates from the template space. A template update process may be performed by processor 104 to add and/or subtract templates from the template space. For example, the template space may be updated with additional templates to adapt to changes in the authorized user's appearance and/or changes in hardware performance over time. Templates may be subtracted from the template space to compensate for the addition of templates when the template space for storing templates is full.

In some embodiments, camera module 102 captures multiple pairs of images for a facial recognition session. Each pair may include an image captured using a two-dimensional capture mode (e.g., a flood IR image) and an image captured using a three-dimensional capture mode (e.g., a depth map image). In certain embodiments, ISP 110 and/or SEP 112 process the flood IR images and depth map images independently of each other before a final authentication decision is made for the user. For example, ISP 110 may process the images independently to determine characteristics of each image separately. SEP 112 may then compare the separate image characteristics with stored templates for each type of image to generate an authentication score (e.g., a matching score or other ranking of matching between the user in the captured image and in the stored templates) for each separate image. The authentication scores for the separate images (e.g., the flood IR and depth map images) may be combined to make a decision on the identity of the user and, if authenticated, allow the user to use device 100 (e.g., unlock the device).

In some embodiments, ISP 110 and/or SEP 112 combine the images in each pair to provide a composite image that is used for facial recognition. In some embodiments, ISP 110 processes the composite image to determine characteristics of the image, which SEP 112 may compare with the stored templates to make a decision on the identity of the user and, if authenticated, allow the user to use device 100.

In some embodiments, the combination of flood IR image data and depth map image data may allow for SEP 112 to compare faces in a three-dimensional space. In some embodiments, camera module 102 communicates image data to SEP 112 via a secure channel. The secure channel may be, for example, either a dedicated path for communicating data (i.e., a path shared by only the intended participants) or a dedicated path for communicating encrypted data using cryptographic keys known only to the intended participants. In some embodiments, camera module 102 and/or ISP 110 may perform various processing operations on image data before supplying the image data to SEP 112 in order to facilitate the comparison performed by the SEP.

In certain embodiments, processor 104 operates one or more machine learning models. Machine learning models may be operated using any combination of hardware and/or software (e.g., program instructions) located in processor 104 and/or on device 100. In some embodiments, one or more neural network modules 114 are used to operate the machine learning models on device 100. Neural network modules 114 may be located in ISP 110 and/or SEP 112.

Figure 4:
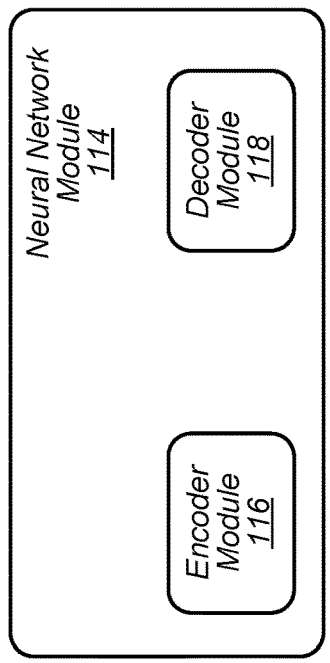
FIG. 4 depicts a representation of an embodiment of a neural network module.

FIG. 4 depicts a representation of an embodiment of neural network module 114. Neural network module 114 may include any combination of hardware and/or software (e.g., program instructions) located in processor 104 and/or on device 100. In some embodiments, neural network module 114 is a multi-scale neural network or another neural network where the scale of kernels used in the network can vary. In some embodiments, neural network module 114 is a recurrent neural network (RNN) such as, but not limited to, a gated recurrent unit (GRU) recurrent neural network or a long short-term memory (LSTM) recurrent neural network.

Neural network module 114 may include neural network circuitry installed or configured with operating parameters that have been learned by the neural network module or a similar neural network module (e.g., a neural network module operating on a different processor or device). For example, a neural network module may be trained using training images (e.g., reference images) and/or other training data to generate operating parameters for the neural network circuitry. The operating parameters generated from the training may then be provided to neural network module 114 installed on device 100. Providing the operating parameters generated from training to neural network module 114 on device 100 allows the neural network module to operate using training information programmed into the neural network module (e.g., the training-generated operating parameters may be used by the neural network module to operate on and assess images captured by the device).

In certain embodiments, neural network module 114 includes encoder module 116 and decoder module 118. Encoder module 116 and decoder module 118 may be machine learning models operated inside neural network module 114 (e.g., the encoder module and the decoder module are executed in neural network module). Encoder module 116 may encode images input into the encoder module and define features in the images as feature vectors in a feature space (as described herein). Decoder module 118 may decode the feature vectors in the feature space generated by encoder module 116 and provide an output (as described herein).

Figure 5:
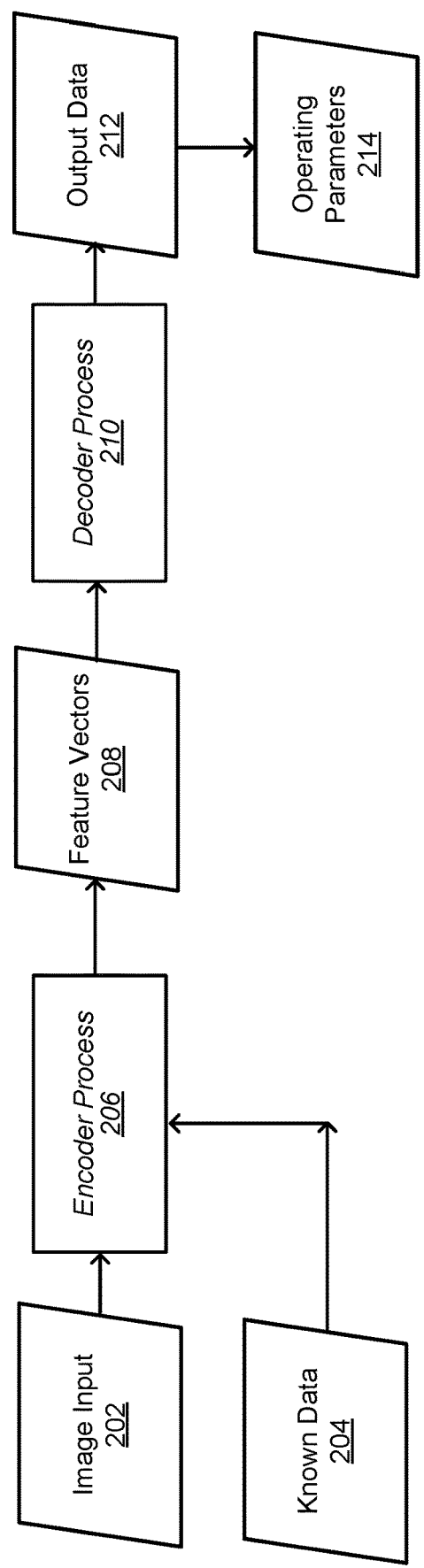
FIG. 5 depicts a flowchart for an embodiment of a training process for a neural network module.
Figure 6:
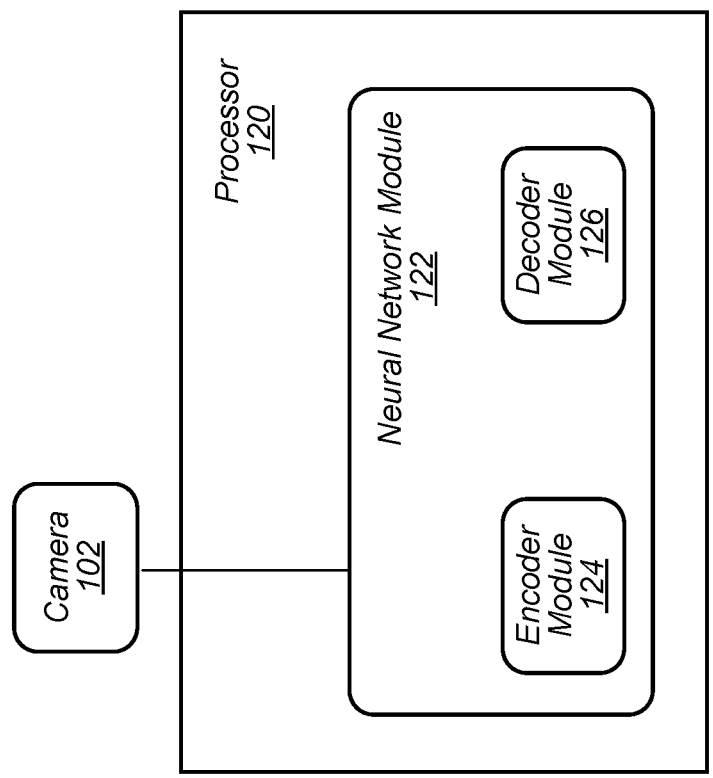
FIG. 6 depicts a representation of an embodiment of a processor with a neural network module.

FIG. 5 depicts a flowchart for an embodiment of training process 200 for a neural network module. In certain embodiments, training process 200 is implemented using a neural network module (e.g., a training neural network module) that is located on a computer processor other than processor 104. FIG. 6 depicts a representation of an embodiment of processor 120 with neural network module 122 that may be used for training (e.g., the training neural network module). Neural network module 122 may include encoder module 124 and decoder module 126. In certain embodiments, images that have been previously captured are provided to neural network module 122 as training images. Known properties of the training images may be provided to neural network module 122 along with the training images (e.g., the training images may be augmented with the known properties). In some embodiments, camera 102 may be coupled to processor 120 and/or neural network module 122. Camera 102 may be used to capture images of the training images and provide the camera-captured images to neural network module 122.

Encoder module 124 and decoder module 126 may be substantially similar or substantially the same as encoder module 116 and decoder module 118, respectively. Encoder module 124 and decoder module 126 may be located in neural network module 122 on processor 120 to be trained by training process 200. Operating parameters output generated from "trained" neural network module 122 may then be used in neural network module 114 on device 100 for implementation of the "trained" neural network module on the device.

In some embodiments, processor 120 is a GPU-enabled computer processor. Training neural network module 122 on the GPU-enabled computer processor may output operating parameters using a floating-point number representation mode. For example, operating parameters generated from "trained" neural network module 122 may include weights or kernels that are described using floating-point numbers. In such embodiments, the floating-point operating parameters may need to be converted to integer number representations before being used on neural network module 114 on device 100. Any conversion process known in the art may be used to convert the operating parameters from the floating-point number representation mode to the integer number representation mode.

In certain embodiments, as shown in FIG. 5, training process 200 begins with providing image input 202. Image input 202 may include training images provided to training process 200 (e.g., training images augmented or annotated (e.g., labelled) with the known information as described above are provided to the training process). In some embodiments, image input 202 includes training images captured with camera 102 or otherwise provided to training process 200 (e.g., digitally provided to the training process). Training images may include reference images or other sample images obtained from a database of images. For example, training images may be obtained from ImageNet or another similar image database. In certain embodiments, training process 200 is implemented on flood IR illumination images to train the neural network module for face detection in such images. In some embodiments, training process 200 is implemented on depth map images to train the neural network module for face detection in such images.

Image input 202 may include a plurality of training images with a variety of different users and/or faces in the images. In some embodiments, the faces in the images have varying locations in the images and/or poses in the images. The locations and/or poses of the faces in the training images may be known (e.g., the images have labels or other indicia identifying the known information of the locations and poses). The known information for locations and poses may be provided into training process 200 as known data 204. In some embodiments, the training images are augmented with known data 204.

In certain embodiments, image input 202 includes providing training images to training process 200 in different situations. For example, a single or individual training image (or a selection of training images) may be provided to the training process multiple times (e.g., multiple passes or presentations of the image) in different scenarios and/or under different operating conditions. In each presentation of the training image to training process 200, the image may be presented in a different situation. Different situations may include, but not be limited to, different orientations, different exposures, different distances, and/or different portions of face in the image. Presenting training images in multiple different situations may provide a more robust training process 200. The more robust training process may produce operating parameters output for neural network module 122 that provide more robust face detection using neural network module 114 on device 100 (with the output operating parameters from neural network module 122 implemented on neural network module 114). For example, neural network module 114 may be capable of providing face detection in many different operating conditions and many different image input situations based on the more robust training process.

Figure 7:
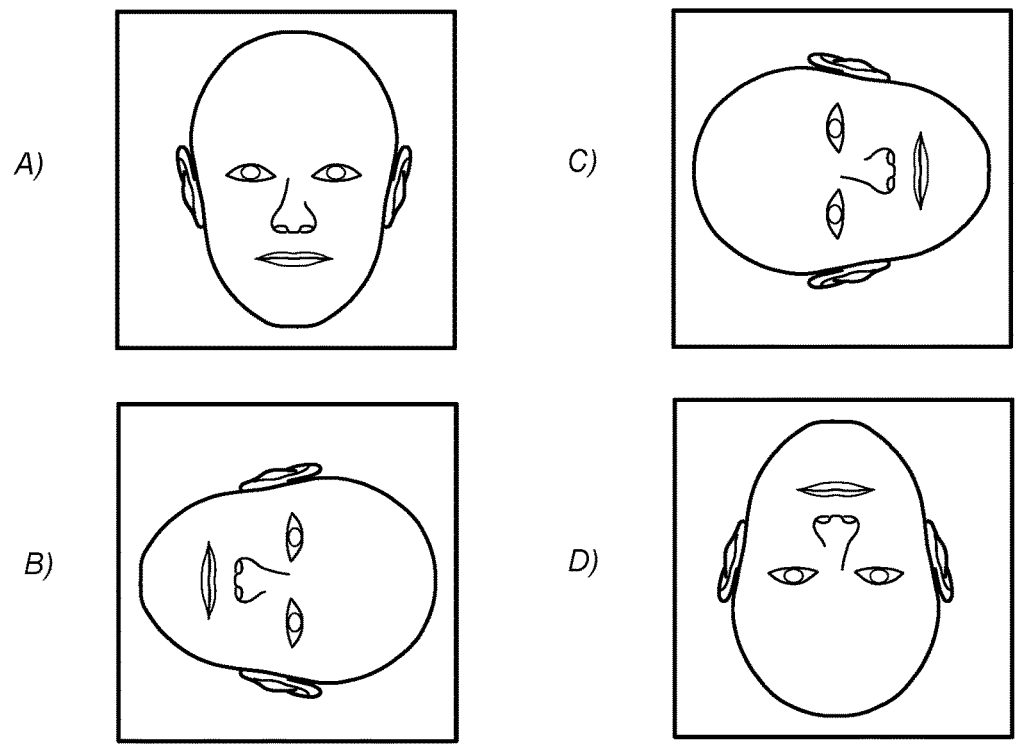
FIG. 7 depicts examples of faces in training images in different orientations.

In certain embodiments, a training image is provided to training process 200 in a different orientation in each presentation of the image (e.g., each capture or processing of the image) in the training process. Providing the training image in different orientations may provide the face of the user in the image to training process 200 in different orientations. The different orientations in the presentations of the training image may include any orientation. In some embodiments, the training image is provided in four different orientations (e.g., the face is in four different orientations), as shown in FIG. 7—(a) normal portrait; (b) right rotated landscape; (c) left rotated landscape; and (d) upside down portrait. The training image may, however, be provided in any orientation desired. For example, the individual training image may be rotated by 30° increments between different presentations of the image to training process 200. In some embodiments, training images are provided to neural network module 122 an equal number of times in each orientation.

Training neural network module 122 with training images provided in different orientations may produce operating parameters output for a neural network module that provides face detection that is more robust to orientation in the images. For example, neural network module 114 may be implemented with the operating parameters output from neural network module 122. Using these operating parameters, neural network module 114 may provide face detection that is more robust when the neural network module encounters images with different orientations. For example, neural network module 114 may be capable of providing face detection for faces presented in any orientation (e.g., the face may be detected in portrait right side up, portrait upside down, left rotated landscape, or right rotated landscape).

In some embodiments, a training image is provided to training process 200 with the entire face of the user within the frame of the image presented to the training process (e.g., the entire face of the user is within the frame of the image processed by the training process). In certain embodiments, training images are provided to training process 200 with only a portion of the face of the user within the frame of the image being provided to the training process. For example, the training image may be moved up, down, left, or right to move the face of the user towards an edge of the frame in the image provided to training process 200. Such provided images may have at least some part of the face being moved outside of the edge of the provided image. Moving at least some part of the face outside of the edge of the provided image may provide only a part of the user's face (e.g., a partial face) to training process 200 (e.g., only the partial face is process by the training process).

In certain embodiments, the training image is provided to training process 200 multiple times (e.g., multiple presentations of the training image to the training process) with different partial faces in each of the separate presentations of the training image. For example, each separate presentation of the training image may provide different partial portions of the face to the training process. Different partial portions of the face may include different regions of the face being positioned in the frame of the image presented to training process 200. For example, the frame of the image may have a portion of the forehead of the face cropped out or cut off, the frame of the image may have a portion of the chin cropped out or cut off, and/or the frame of the image may have one side of the face cropped out or cut off.

Figure 8:
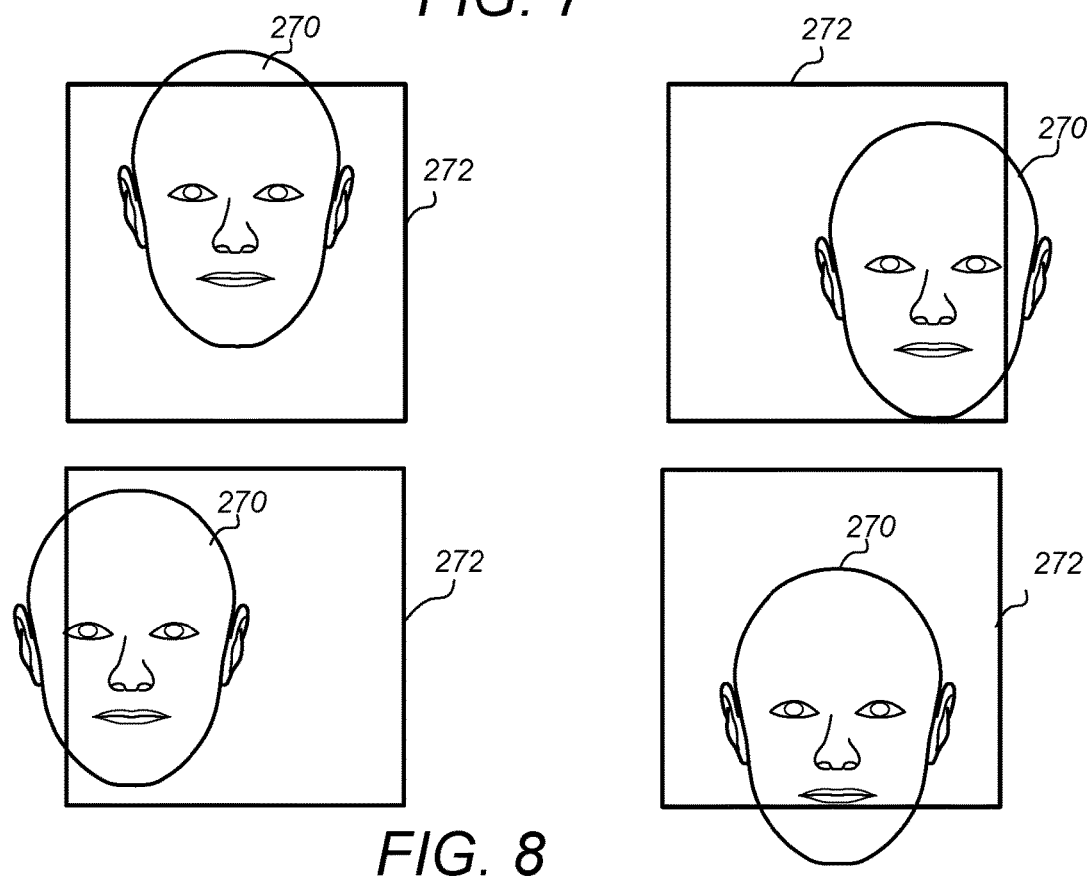
FIG. 8 depicts examples of multiple faces presented to a training process with different partial portions for each of the faces.

FIG. 8 depicts examples of multiple faces presented to training process 200 with different partial portions for each of the faces. The portions of faces 270 outside frame 272 are not provided to training process 200 (e.g., are cropped out or cut off from the presentation of the image to the training process). Thus, training process 200 is trained to detect the faces in the training images with only portions of the faces present in the images.

In certain embodiments, training process 200 is operated to allow face detection on less than a whole face of the user in the image (e.g., only a partial percentage of the face is needed to provide face detection). Training processes have typically been trained to only allow face detection with an intersection over union of 1 (where intersection over union is a metric comparing the predicted bounding box to the actual/known (ground truth) bounding box for the face in the image). The intersection over union of 1 provides that the predicted bounding box fully overlaps (has full union) with the ground truth bounding box. Training process 200 may, however, be operated to provide face detection for intersection over union values of less than 1 but above a selected value (e.g., 0.8, 0.85, 0.9 or greater). Operating training process 200 with intersection over union values of less than 1 provides face detection for partial faces in the training images. The intersection over union values may, however, be operated above the selected value to maintain accuracy (e.g., prevent false positives) in the face detection process.

Training neural network module 122 with training images provided with different partial portions for each of the faces and allowing face detection for partial percentages of the face may produce operating parameters output for a neural network module that provides face detection that is more robust to partial faces being present in the images. For example, neural network module 114 may be implemented with the operating parameters output from neural network module 122. Using these operating parameters, neural network module 114 may be more robust by providing face detection in captured images that have only partial faces in the image frames. Additionally, training neural network module 122 with training images provided with different partial portions and allowing face detection for partial percentages of the face may improve face detection for images with whole faces in the image.

In certain embodiments, the training images provided to training process 200 include training images without faces in the images. Training images without faces may be used to train neural network module 122 that faces are not detected in certain situations. Training of neural network module 122 may be useful in combination with training of the neural network module for detection of partial faces to prevent increases in the false acceptance rate and provide better accuracy in face detection.

In certain embodiments, training images are provided multiple times to training process 200 (e.g., multiple presentations of the training image to the training process) with different exposures in each of the separate presentations of the training images. For example, a training image may be provided in a first presentation with a normal exposure, in a second presentation with a darker exposure, and in a third presentation with a lighter exposure.

Training neural network module 122 with training images provided with different exposures may produce operating parameters output for a neural network module that provides face detection that is more robust to different exposures in captured images. For example, neural network module 114 may be implemented with the operating parameters output from neural network module 122. Using these operating parameters, neural network module 114 may be more robust by providing face detection over a wider range of exposure conditions. Neural network module 114 may be capable of providing face detection that is substantially invariant to changes in exposures in the images. Thus, exposure adjustments for images captured by device 100 may not be necessary using neural network module 114 implemented with operating parameters that provide more robust operation.

In some embodiments, training images are provided (e.g., presented to training process 200) at varying distances between the image and the camera. The value of distance for each provided image may be known and the known information may be provided into known data 204 along with the known information for locations and poses. Thus, the known information of these properties (locations and/or poses of the face and distance between the face and camera) are included in known data 204.

Training neural network module 122 with training images provided at varying distances may produce operating parameters output for a neural network module that provides face detection that is more robust to distance from the camera in captured images. For example, neural network module 114 may be implemented with the operating parameters output from neural network module 122. Using these operating parameters, neural network module 114 may be capable of providing face detection over a greater range of distances between the user's face and device 100. Thus, neural network module 114 may provide more robust face detection with respect to the distance between the user's face and device 100.

As shown in FIG. 5, image input 202 may be provided to encoder process 206. Encoder process 206 may be performed by, for example, encoder module 124, shown in FIG. 6. In encoder process 206, shown in FIG. 5, the encoder module may encode images input into the encoder process and define features in the images as feature vectors in a feature space. For example, the encoder module may define facial features in a user's face (and other features in the images) as feature vectors in the feature space. Encoder process 206 may output feature vectors 208. Feature vectors 208 (e.g., the output of encoder process 206 (and the encoder module)) includes feature vectors representing the user's facial features (and/or other features in the images) in the feature space. A feature space may be an N-dimensional feature space. A feature vector may be an n-dimensional vector of numerical values that define features in the image for a region in the feature space that corresponds to a region in the image. For example, in some embodiments, the feature vector may be a 1024-dimensional vector. Any number of dimensions may be implemented in various embodiments.

Figure 9:
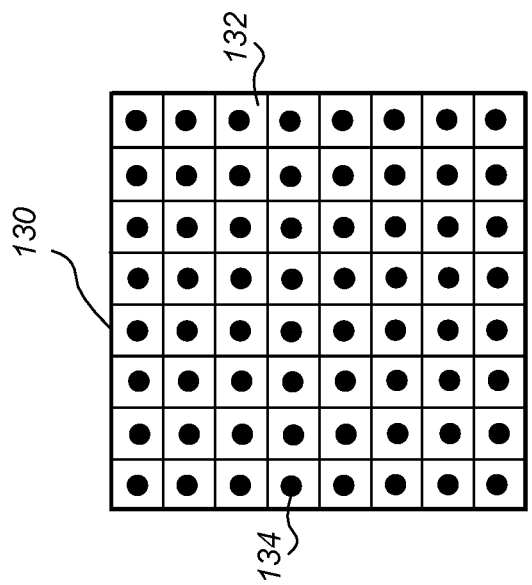
FIG. 9 depicts an example of an embodiment of a feature space with regions.

FIG. 9 depicts an example of an embodiment of feature space 130 with regions 132. Regions 132 in feature space 130 may be, for example, cells in a grid with the grid representing the feature space. In the example of FIG. 9, feature space 130 is an 8×8 grid of regions 132. Feature space 130 may, however, have a different dimension grid as needed. Dots 134 represent feature vectors in each of regions 132. Regions 132 in feature space 130 may correspond to regions or areas in the input images. Thus, in the example of FIG. 9, the input image is divided into 64 regions (8×8 regions) in feature space 130 with each region 132 representing a different region of the input image.

In certain embodiments, the encoder module used in encoder process 206 (e.g., encoder module 124, shown in FIG. 6) is a neural network. For example, the encoder module may be a multi-scale neural network or another neural network where the scale of kernels used in the network can vary. In certain embodiments, the encoder module is a multi-scale convolutional neural network. Using a multi-scale convolutional neural network, encoder process 206 may generate a high-level representation of image input 202 with high-level feature vectors in the feature space. For example, encoder process 206 may generate a 32×32 grid representation with a feature vector in each region (cell) of the grid whereas the input image may have a higher resolution (e.g., image input 202 may be a 256×256 image).

As shown in FIG. 5, feature vectors 208 may be provided into decoder process 210. Decoder process 210 may be performed by, for example, decoder module 126, shown in FIG. 6. In decoder process 210, the decoder module may decode the feature vectors in the feature space of feature vectors 208 generated in encoder process 206. Decoding the feature vectors may include operating on the feature vectors with one or more classifiers or a classification-enabled network to determine (e.g., extract) output data 212 from image input 202. Output data 212 may include, for example, information or properties about faces in image input 202.

In certain embodiments, the decoder module used in decoder process 210 (e.g., decoder module 126) is a neural network. For example, the decoder module may be a recurrent neural network (RNN). In certain embodiments, the recurrent neural network includes a gated recurrent unit (GRU). Other recurrent neural networks may, however, also be used such as a long short-term memory (LSTM) recurrent neural network.

In certain embodiments, decoder process 210 includes decoding feature vectors for each region in the feature space (e.g., each region 132 in feature space 130, shown in the example of FIG. 9). Feature vectors from each of the regions of the feature space may be decoded into non-overlapping boxes in output data 212. In certain embodiments, decoding the feature vector (e.g., extracting information from the feature vector) for a region includes determining (e.g., detecting) if a face is present in the region. In training process 200, the presence of a face in the image input 202 is known and may be correlated with the decoded feature vectors. As decoder process 210 operates on each region in the feature space, the decoder module may provide a face detection score (e.g., a prediction based on a confidence score on whether a face or portion of a face is detected/present in the region) for each region in the feature space. In some embodiments, using the RNN, multiple predictions on whether a face is present may be provided for each region of the feature space with the predictions including predictions about both portions of a face inside the region and portions of a face around the region (e.g., in adjacent regions). These predictions may be collapsed into a final decision of the presence of a face in image input 202 (e.g., detection of the face and its location in image input 202).

Figure 10:
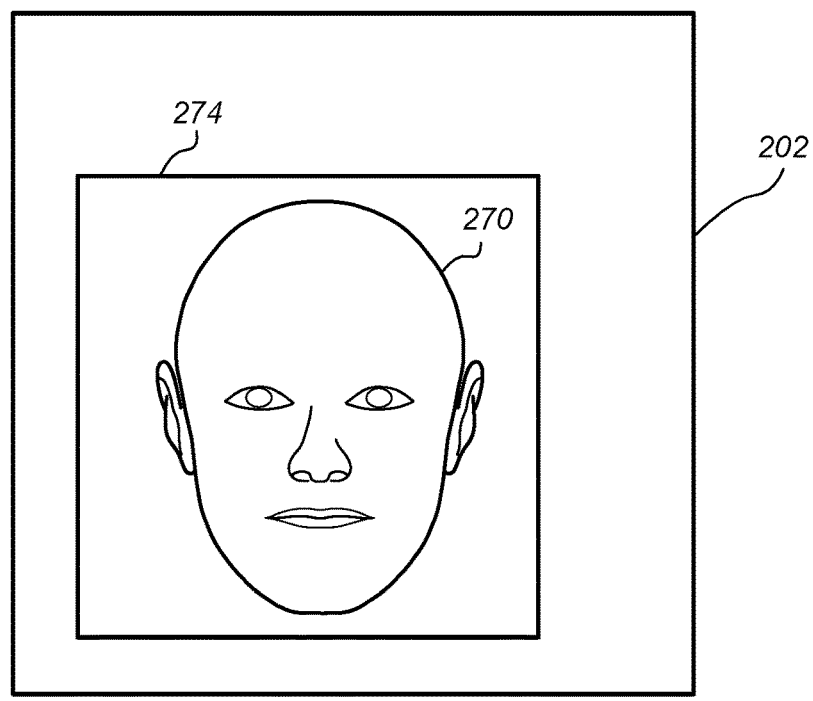
FIG. 10 depicts an example of a bounding box formed (e.g., placed) around a face in image input.

In certain embodiments, the predictions are used to form (e.g., place) a bounding box around the face detected in image input 202. FIG. 10 depicts an example of bounding box 274 formed (e.g., placed) around face 270 in image input 202. Output data 212 may include the decision on the presence of the face and the bounding box formed around the face in image input 202.

In certain embodiments, a face is detected in a region without much overlap with adjacent regions as the regions are decoded as non-overlapping boxes. In some embodiments, however, multiple regions decoded in decoder process 210 may detect the same face. If the same face is detected in multiple regions, then confidences for these regions may be ranked. The multiple predictions may be used to determine a confidence that a face, or a portion of a face, is present in each region (e.g., the predictions may be used to rank confidence for the regions). The region(s) with the highest confidence for the detected face may then be selected as the region used in training process 200.

In certain embodiments, when the presence of a face is detected, the predictions generated by decoder process 210 includes assessments (e.g., determinations) of one or more properties of the detected face. The assessed properties may include a position of the face in the image (which may be represented by the bounding box for the face in the image)), a pose of the face (e.g., the pose of the face in the bounding box), and a distance between the face and the camera. Pose of the face may include pitch, yaw, and/or roll of the face. The assessed properties may be included in output data 212 along with the decision on the presence of the face in image input 202.

In training process 200, the values of the properties of the face may be determined by correlating decoded feature vectors with known data 204. For example, known data 204 may provide known properties of the face(s) in image input 202 with the known properties defining the properties assessed by decoder process 210. In certain embodiments, during training process 200, correlating decoded feature vectors with known data 204 includes the decoder module for decoder process 210 assessing differences between decoded feature vectors and known data 204. The detector module may, for example, perform error function analysis (or similar analysis) on the differences between the decoded feature vectors and known data 204 and refine the feature vector decoding process until the feature vector decoding process accurately determines the known data. Thus, as multiple training images are processed in training process 200, decoder process 210 (and encoder process 206) may be trained by the training images in image input 202 and known data 204 to accurately detect the present of face(s) and assess values of properties of the face(s).

In certain embodiments, outputs for pose of the face and/or distance between the face and the camera are discretized (e.g., provided as discrete outputs). For example, pitch, yaw, and roll values may be decoded as floating-point values. In some embodiments, the floating-point values may be positive or negative floating-point values. Instead of performing a regression on the floating-point values, the floating-point outputs may be discretized by choosing a minimum and maximum range and then dividing the floating-point outputs into K bins, where K is a positive integer. Using the bins, if the output falls into a bin, it gets assigned a 1, if the output does not fall into a bin, it gets assigned a 0. If the floating-point value is not in the range represented by the bins, it may first be clipped to the closest value in the range. Thus, the floating-point outputs may be transformed from a floating-point value to a discrete vector of 0s and 1s (e.g., a feature vector is a discrete vector of 0s and 1s). The network (e.g., the encoder module) may then be trained to predict the K-dimensional vectors instead of a single floating-point value. At runtime (e.g., during operation on a device), a single floating-point value may be recovered from these K-dimensional outputs by treating the network's activation for each bin as a weight. Then taking the weighted-sum of the center values of each bin may yield a single floating-point value.

As example, the minimum and maximum range may be 0 to 10, and there are ten bins. Then, if a floating-point training target is between 0 and 1, it is assigned to the first bin, if it is between 1 and 2, it is assigned to the second bin, and so forth. Values below 0 are assigned to the first bin, and values above 10 are assigned to the last bin. With this procedure, a training value of 2.4 would be transformed into the vector (0 0 1 0 0 0 0 0 0 0), a training value of −1.3 would be transformed into the vector (1 0 0 0 0 0 0 0 0 0), and a training value of 11.9 would be transformed into the vector (0 0 0 0 0 0 0 0 0 1). At runtime, if the network output vector is (0 0 1 1 0 0 0 0 0 0), then the weighted sum procedure would result in the value 3.0.

In some embodiments, during training, the K-dimensional vector may be based on "soft" assignments using any suitable algorithm or formula. For example, given an initial bin assignment as above, the neighboring bins may also be given a value related to the difference between the target and the bin's center value. As an example, the training value of 2.4 in the above example may be instead transformed into the vector (0.67 1.54 0 0 0 0 0 0) based on a simple exponential formula.

Transforming the floating-point values to the discrete vector allows decoder process 210 (and the decoder module) to operate on values for pose of the face and/or distance between the face and the camera by classifying which bin the values are in instead of using a regression solution that is needed for floating-point values. After classifying, decoder process 210 may include mapping of a weighted sum of what floating-point value the center of a bin represents (e.g., weighted average of hump for the bin). The classifying and mapping of the discrete vector and the bins may provide output of pose and/or distance assessments that are relatively accurate.

Using classification on discrete vectors instead of regression on floating-point values may allow decoder process 210 to more readily learn (e.g., be trained in training process 200) as neural networks are typically better at doing classifications than regressions. Additionally, error function signals for regressions may be relatively large as error function signals in regressions are bigger the farther the difference is whereas error function signals for discrete vectors and bins are substantially the same no matter how big a difference in error. Thus, using discrete vectors and bins in decoder process 210 to assess pose and/or distance may be more efficient for the decoder process learning than using floating-point values.

As described, training process 200 may include training encoder process 206 and decoder process 210 (and their corresponding encoder and decoder modules) on a plurality of training images with a variety of different users and/or faces in the images along with varying properties and/or situations of the faces in the images. After training process 200 is completed on a set of training images, operating parameters 214 may be generated by the training process based on the correlation between the decoded features vectors and known data 204. Operating parameters 214 include parameters useable in neural network module 122 (e.g., encoder module 124 and decoder module 126), shown in FIG. 6, to detect face(s) input into the neural network module from camera 102 and assess values of properties of the face(s) (e.g., a position of the face (as represented by the bounding box for the face), a pose of the face, and a distance between the face and the camera). In some embodiments, operating parameters 214 include classifying parameters used in decoder module 126. Classifying parameters may include parameters used to classify the decoded feature vectors that have been correlated with known data 204 during training process 200. Decoder module 126 may then be able to classify feature vectors for a captured image generated by encoder module 124 using the classifying parameters. Decoding the feature vectors for the captured image by classifying the feature vectors (using the classifying parameters) may allow neural network module 122 to assess the presence of face(s) and the values of properties of the face(s) in the captured image.

Figure 11:
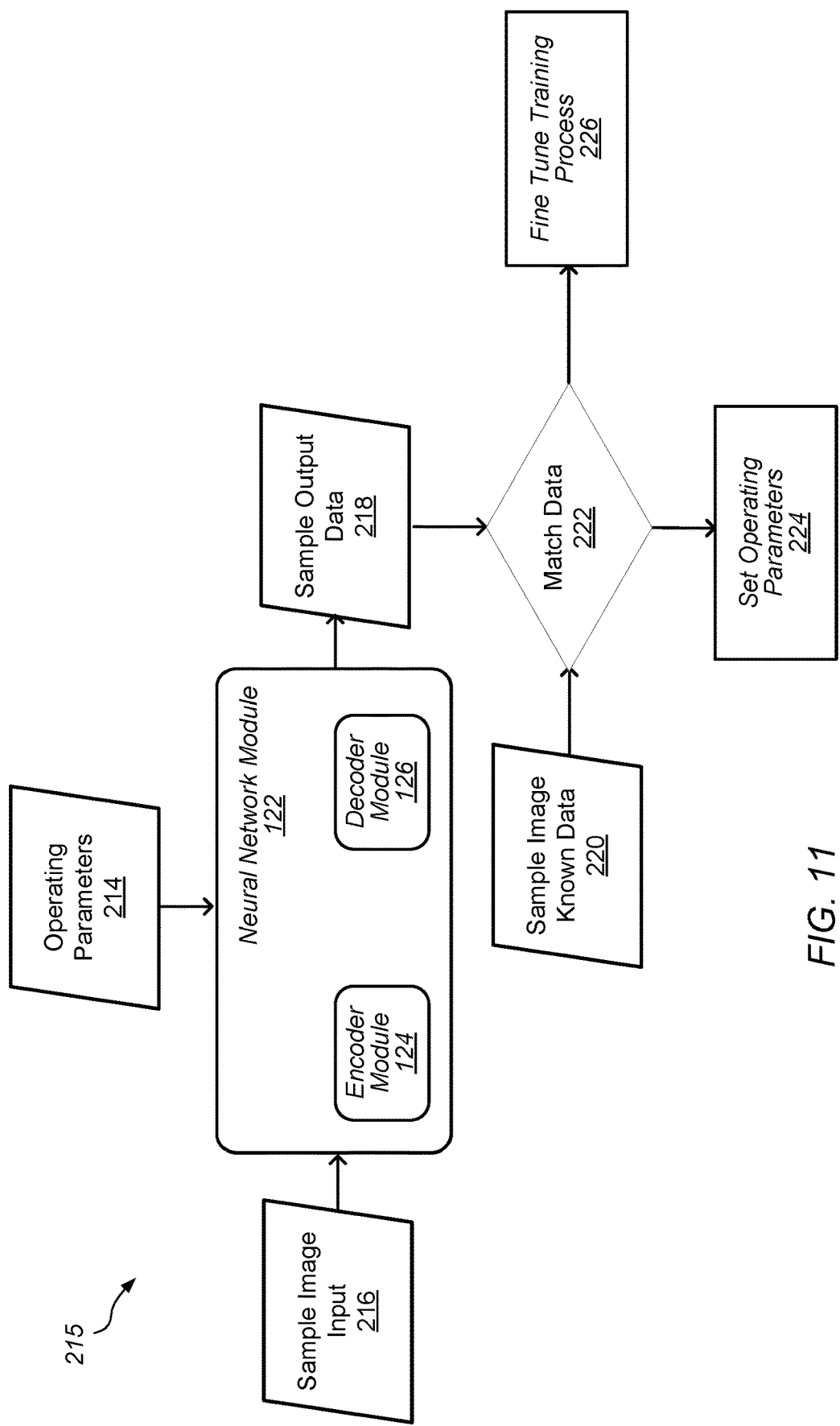
FIG. 11 depicts a flowchart for an embodiment of a test process for a neural network module.

In some embodiments, operating parameters 214 may be tested by inputting the operating parameters into neural network module 122 and operating the module on a sample image with known information (e.g., known face location (known bounding box location), known pose, and known distance). FIG. 11 depicts a flowchart for an embodiment of a test process for neural network module 122. In test process 215, sample image input 216 may be provided to neural network module 122 along with operating parameters 214. Neural network module 122 may provide sample output data 218 by processing sample input image 216 using operating parameters 214. Sample output data 218 may be compared to sample image known data 220 to see if the data matches in match data 222.

If sample output data 218 matches sample image known data 220, then the operating parameters are set in 224 (e.g., operating parameters 214 may be set and used to program neural network module 114 on processor 104, shown in FIG. 3, for use in a facial detection process described herein). If sample output data 218 does not match sample image known data 220 (within desired tolerances), then the training process (e.g., training process 200, shown in FIG. 5) may be fine-tuned in 226. Fine-tuning the training process may include providing additional training images to training process 200 and/or other adjustments in the training process to refine the operating parameters (or generate new operating parameters) for neural network module 122.

Once operating parameters 214 for neural network module 122 are set in 224, the operating parameters may be applied to device 100, shown in FIG. 1, by providing the operating parameters to neural network module 114 on the device. In certain embodiments, operating parameters 214 for neural network module 122 are in a number representation mode that is different from the number representation mode that neural network module 114 uses to operate. For example, neural network module 122 may use floating-point numbers while neural network module 114 uses integer numbers. Thus, in such embodiments, operating parameters 214 for neural network module 122 are converted from the floating-point operating parameters to integer operating parameters for use in neural network module 114.

Figure 12:
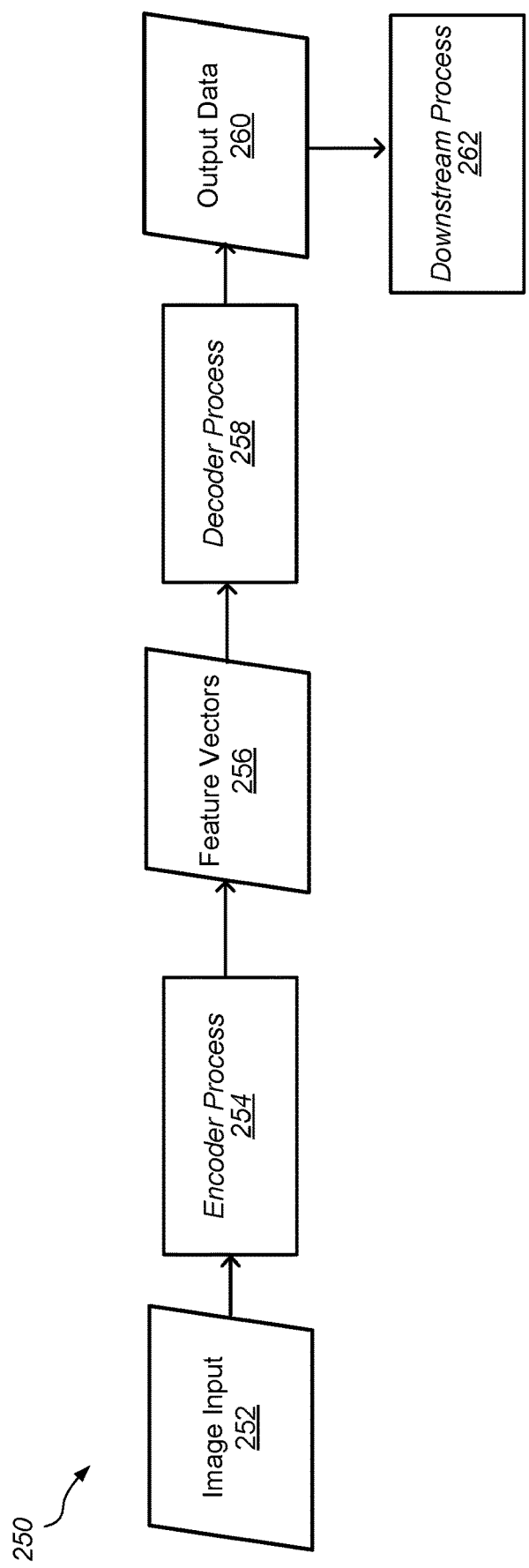
FIG. 12 depicts a flowchart for an embodiment of a face detection process implemented using a neural network module on a device.

After operating parameters are provided to neural network module 114, the neural network module may operate on device 100 to implement a face detection process on the device. FIG. 12 depicts a flowchart for an embodiment of face detection process 250 implemented using neural network module 114 on device 100. Image input 252 may include an image captured using camera 102 on device 100. The captured image may be a flood IR illumination image or a depth map image. Face detection process 250 may be used to detect if there is a face in the image (e.g., place a bounding box around the face) and, if a face is detected, assess values of properties of the face (e.g., location, pose, and/or distance).

The captured image from image input 252 may be provided to encoder process 254. Encoder process 254 may be performed by encoder module 116, shown in FIG. 4. In certain embodiments, encoder module 116 is a multi-scale convolutional neural network (e.g., encoder module 116 is substantially the same neural network as encoder module 124). In encoder process 254, encoder module 116 may encode image input 252 to represent features in the image as feature vectors in a feature space (e.g., a feature space substantially similar to feature space 130, shown in FIG. 9). Encoder process 254 may output feature vectors 256. Feature vectors 256 may be, for example, encoded image features represented as vectors.

Feature vectors 256 may be provided into decoder process 258. Decoder process 258 may be performed by decoder module 118, shown in FIG. 4. In certain embodiments, decoder module 118 is a recurrent neural network (e.g., decoder module 118 is substantially the same neural network as decoder module 126). In decoder process 258, the decoder module may decode feature vectors 256 to assess one or more properties of image input 252 to determine (e.g., extract) output data 260 from the image input. Decoding the feature vectors may include classifying the feature vectors using classifying parameters determined during training process 200. Classifying the feature vectors may include operating on the feature vectors with one or more classifiers or a classification-enabled network.

In certain embodiments, decoder process 258 includes decoding feature vectors for each region in the feature space. Feature vectors from each of the regions of the feature space may be decoded into non-overlapping boxes in output data 260. In certain embodiments, decoding the feature vector (e.g., extracting information from the feature vector) for a region includes determining (e.g., detecting) if a face is present in the region. As decoder process 258 operates on each region in the feature space, the decoder module may provide a face detection score (e.g., a prediction based on a confidence score on whether a face or portion of a face is detected/present in the region) for each region in the feature space. In some embodiments, using the RNN, multiple predictions on whether a face (or a portion of face) is present may be provided for each region of the feature space with the predictions including predictions about both portions of a face inside the region and portions of a face around the region (e.g., in adjacent regions). These predictions may be collapsed into a final decision of the presence of the face in image input 252 (e.g., detection of the face in the image input). In certain embodiments, the predictions are used to form (e.g., place) a bounding box around the face detected in image input 252. Output data 260 may include the decision on the presence of the face and the bounding box formed around the face in image input 252 (e.g., in the captured image).

In certain embodiments, face detection process 250 detects the presence of a face in image input 252 regardless of the orientation of the face in the image input. For example, neural network module 114 may operate face detection process 250 using operating parameters implemented from a training process developed to detect faces in any orientation in the image input, as described above. Thus, face detection process 250 may detect the face in image input 252 that has any orientation in the image input without the need to rotate the image and/or receive any other sensor input data (e.g., accelerometer or gyroscope data) that may provide information about the orientation of the image. Detecting faces in any orientation also increases the range for pose estimation in the bounding box. For example, roll estimation in the bounding box may be from −180° to +180° (all roll orientations).

In certain embodiments, face detection process 250 detects the presence of a partial face in image input 252. The partial face detected in image input 252 may include any portion of the face present in image input 252. The amount of the face needed to be present in image input 252 for the face to be detected and/or the ability of neural network module 114 to detect the partial face in image input 252 may depend on the training used to generate the operating parameters for the neural network module and/or the facial features detectable in the image input.

Figure 13:
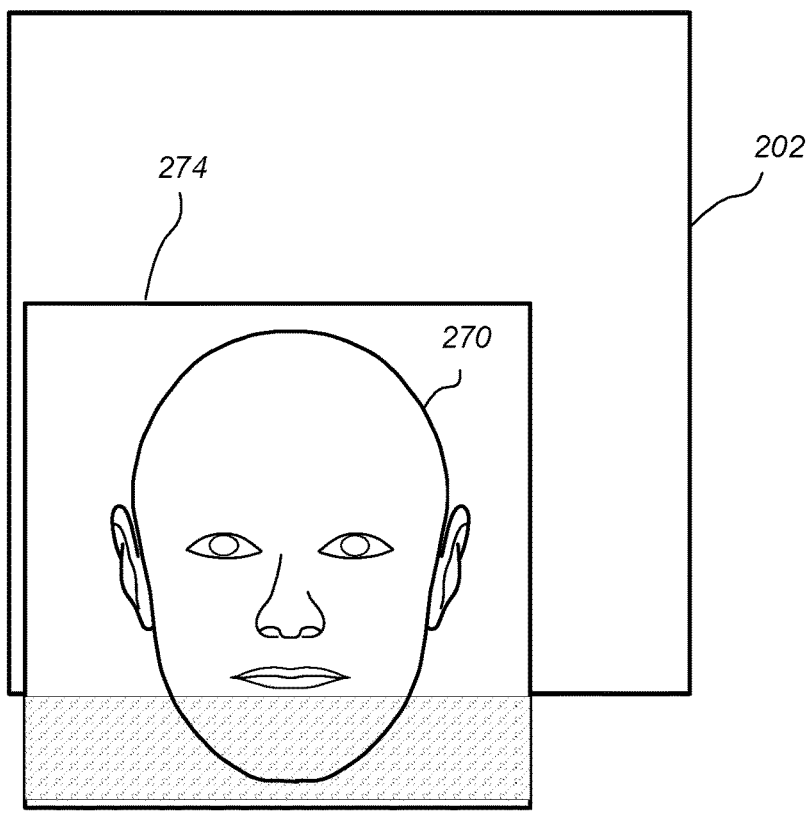
FIG. 13 depicts an example of a partial face detected in image input.

FIG. 13 depicts an example of a partial face detected in image input 252. As shown in FIG. 13, face detection process 250 may place bounding box 274 around face 270 in image input 252. As face 270 is only partially in image input 252, bounding box 274 is placed with parts of the bounding box being outside the frame of the image input. Face detection process 250, without the ability to detect partial faces in image input 252, might otherwise reject image input 252 because part of bounding box 274 exceeds outside the image input. The ability of face detection process 250 to be able to provide face detection on partial faces in image input 252 increases face detection in more challenging detection cases and provides overall improvement in the face detection process.

In certain embodiments, face detection process 250 provides robust face detection in view of other changing properties in the images captured as image input 252. For example, face detection process 250 may provide face detection over a wide range of distances between the face and the camera. Changes in distance between the face and the camera may make the face smaller or bigger in image input 252. Smaller or bigger faces may be more difficult to detect in image input 252. Neural network module 114 may, however, operate using operating parameters implemented from training process 200, as described above, that allow the neural network module to detect faces over a greater range of distances between the face and the camera.

In some embodiments, face detection process 250 may provide face detection over a wide range of exposures in image input 252. In darker light conditions, the camera may increase exposure to provide image input 252. The increased exposure may create more noise in the data of image input 252. In lighter light conditions, the camera may use a small aperture time to capture the image to avoid overexposing the image. With the small aperture time, there may be less data in image input 252 for processing. Neural network module 114 may, however, operate using operating parameters implemented from training process 200, as described above, that allow the neural network module to detect faces over a greater exposure range (and thus a greater range of light conditions).

In some embodiments, multiple regions decoded in decoder process 258 may detect the same face. Confidence rankings of regions may also be determined by decoder process 258. If the same face is detected in multiple regions, then the ranking of confidences for these regions may be used to determine the region with the highest confidence for the detected face. The region with the highest confidence may then be selected to provide output data 260 (including additional data for values of properties of the detected face).

When the presence of a face is detected in the feature space, the predictions generated by decoder process 258 includes assessments (e.g., determinations) of one or more values of properties of the detected face. Assessing values of properties of the detected face may include classifying the feature vectors, during decoding of the feature vectors, using classifying parameters (obtained from training process 200) that are associated with the properties being assessed. In certain embodiments, the assessed values of the properties include a position of the face in the image (as represented by the bounding box), a pose of the face, and a distance between the face and the camera. In certain embodiments, the pose of the face includes pitch, yaw, and/or roll of the face. Assessed values of the properties may be included in output data 260 along with the decision on the presence of the face and the bounding box for the face in image input 252.

In certain embodiments, output data 260 is provided to downstream process 262. Downstream process 262 may include any process downstream of face detection process 250 on device 100 that is capable of using the face detection process output. Examples of downstream process 262 include, but are not limited to, additional image signal processing and security enclave processing such as facial recognition processing or attention detection processing. In some embodiments, one or more values in output data 260 are used to control one or more operations of device 100. In some embodiments, the distance values in output data 260 may be used to control operation of speckle pattern illumination output from camera 102 on device 100. For example, the distance values in output data 260 may be used to determine a density (or a density setting) for speckle pattern illumination output from camera 102, as described in the copending U.S. Provisional Patent Application No. 62/556,832 to Fasel, Guo, Kumar, and Gernoth entitled "DETERMINING SPARSE VERSUS DENSE PATTERN ILLUMINATION", which is incorporated by reference as if fully set forth herein.

As shown in FIG. 12, face detection process 250 may be used to detect one or more faces in an image captured by camera 102 on device 100. Output data 260 may include a decision on a face being in the captured image along with data for values of properties of the detected face (e.g., location, pose, and/or distance from the camera). Face detection process 250 utilizes a single network module (e.g., neural network module 114) to provide face detection output along with location, pose, and distance from the camera of the detected face. As described herein, neural network module 114 implements operating parameters that provide improved and more robust face detection. For example, neural network module 114 may provide face detection with the face in any orientation in a captured image and/or with only a partial face present in the captured image. Additionally, neural network module 114 may provide face detection that is robust and adapts to changes in properties of the captured images in both partial face and whole face situations. For example, face detection process 250 may be robust to changes in exposure and/or distance between the camera and the face of the user. In some embodiments, exposure limits for face detection process 250 may be set by the limits of exposure of the camera used to capture the images (e.g., camera 102 on device 100). Thus, face detection process 250 may be capable of forming the bounding box in an image captured with any illumination provided by an illuminator (e.g., flood illuminator 105A and/or speckle illuminator 105B).

Improving face detection process 250 using training process 200, as described herein, may provide improved false acceptance rates and improved false rejection rates in the face detection process. Additionally, face detection process may provide better location identification of faces in captured images (for either partial face or whole face situations). Providing improved and more robust face detection may also improve downstream processes (e.g., downstream process 262) implemented after face detection. For example, more robust face detection may, in more challenging cases of face detection, increase the likelihood that face detection is accomplished and increase the frequency of cases operated on by downstream processes.

In certain embodiments, one or more process steps described herein may be performed by one or more processors (e.g., a computer processor) executing instructions stored on a non-transitory computer-readable medium. For example, process 200, shown in FIG. 5, or process 250, shown in FIG. 12, may have one or more steps performed by one or more processors executing instructions stored as program instructions in a computer readable storage medium (e.g., a non-transitory computer readable storage medium).

Figure 14:
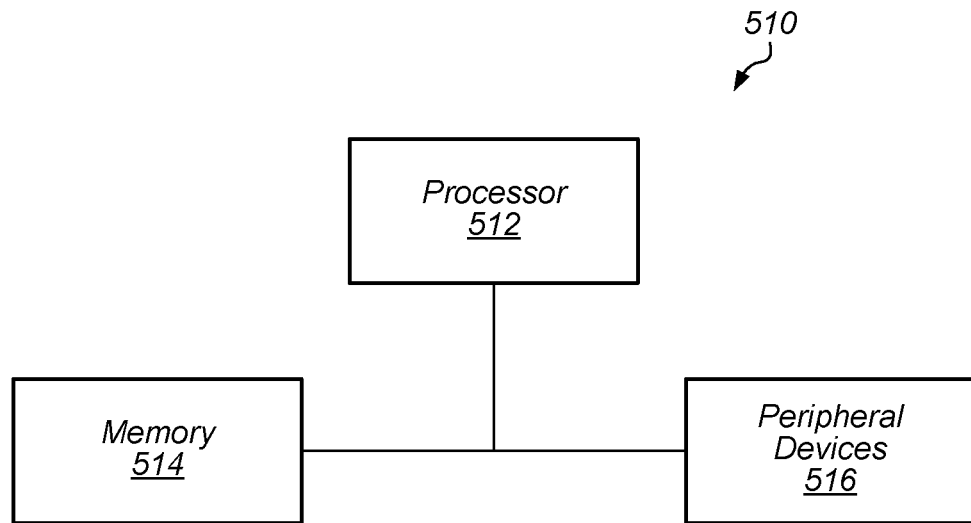
FIG. 14 depicts a block diagram of one embodiment of an exemplary computer system.

FIG. 14 depicts a block diagram of one embodiment of exemplary computer system 510. Exemplary computer system 510 may be used to implement one or more embodiments described herein. In some embodiments, computer system 510 is operable by a user to implement one or more embodiments described herein such as process 200, shown in FIG. 5, or process 250, shown in FIG. 12. In the embodiment of FIG. 14, computer system 510 includes processor 512, memory 514, and various peripheral devices 516. Processor 512 is coupled to memory 514 and peripheral devices 516. Processor 512 is configured to execute instructions, including the instructions for process 200 or process 250, which may be in software. In various embodiments, processor 512 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, computer system 510 may include more than one processor. Moreover, processor 512 may include one or more processors or one or more processor cores.

Processor 512 may be coupled to memory 514 and peripheral devices 516 in any desired fashion. For example, in some embodiments, processor 512 may be coupled to memory 514 and/or peripheral devices 516 via various interconnect. Alternatively or in addition, one or more bridge chips may be used to coupled processor 512, memory 514, and peripheral devices 516.

Memory 514 may comprise any type of memory system. For example, memory 514 may comprise DRAM, and more particularly double data rate (DDR) SDRAM, RDRAM, etc. A memory controller may be included to interface to memory 514, and/or processor 512 may include a memory controller. Memory 514 may store the instructions to be executed by processor 512 during use, data to be operated upon by the processor during use, etc.

Figure 15:
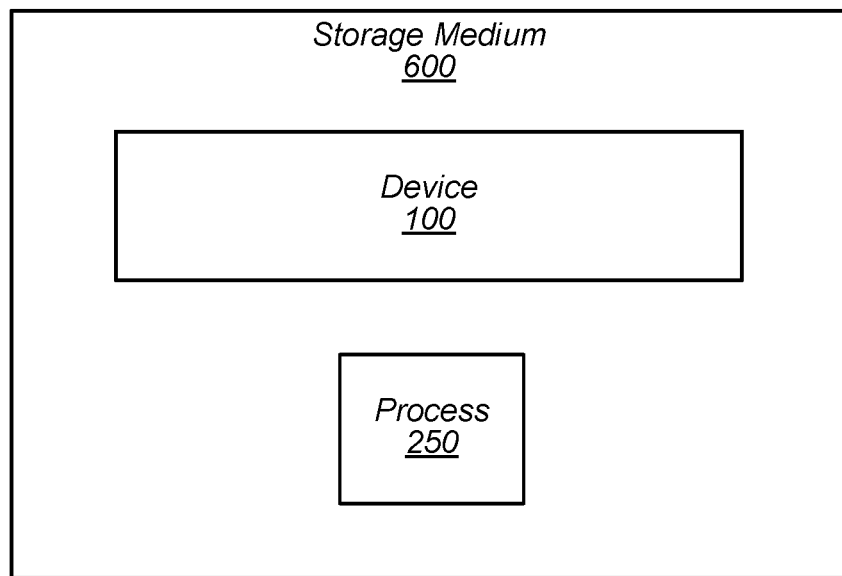
FIG. 15 depicts a block diagram of one embodiment of a computer accessible storage medium.

Peripheral devices 516 may represent any sort of hardware devices that may be included in computer system 510 or coupled thereto (e.g., storage devices, optionally including computer accessible storage medium 600, shown in FIG. 15, other input/output (I/O) devices such as video hardware, audio hardware, user interface devices, networking hardware, etc.).

Turning now to FIG. 15, a block diagram of one embodiment of computer accessible storage medium 600 including one or more data structures representative of device 100 (depicted in FIG. 1) included in an integrated circuit design and one or more code sequences representative of process 250 (shown in FIG. 12). Each code sequence may include one or more instructions, which when executed by a processor in a computer, implement the operations described for the corresponding code sequence. Generally speaking, a computer accessible storage medium may include any storage media accessible by a computer during use to provide instructions and/or data to the computer. For example, a computer accessible storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, computer accessible storage medium 600 may store data in a non-transitory manner, where non-transitory in this context may refer to not transmitting the instructions/data on a signal. For example, non-transitory storage may be volatile (and may lose the stored instructions/data in response to a power down) or non-volatile.

Further modifications and alternative embodiments of various aspects of the embodiments described in this disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as the presently preferred embodiments. Elements and materials may be substituted for those illustrated and described herein, parts and processes may be reversed, and certain features of the embodiments may be utilized independently, all as would be apparent to one skilled in the art after having the benefit of this description. Changes may be made in the elements described herein without departing from the spirit and scope of the following claims.

What is claimed is:

1. A method, comprising:
capturing at least one image using a camera located on a device, the device comprising a computer processor and a memory, wherein the at least one image comprises an image captured while illuminating subjects in the image with an illuminator located on the device;
encoding the at least one image to generate feature vectors defining features of subjects in the image in a feature space;
assessing the generated feature vectors in the feature space to detect a face in the image, wherein at least some part of the face is present in the image, and wherein the face has any orientation in the image;
forming a bounding box around the face detected in the image, wherein, if a portion of the face detected is located outside an image boundary, the bounding box is formed around the at least some part of the face detected to be present in the image; and
providing an output, the output comprising the bounding box formed for the detected face in the image.

2. The method of claim 1, wherein the computer processor comprises a multi-scale convolutional neural network module.

3. The method of claim 1, wherein assessing the generated feature vectors to detect the face in the image comprises determining the feature vectors that represent the face in the image.

4. The method of claim 3, wherein forming the bounding box comprises forming the bounding box around the feature vectors determined to represent face in the image.

5. The method of claim 1, wherein assessing the generated feature vectors to detect the face in the image comprises classifying the feature vectors to determine the feature vectors that represent the face in the image.

6. The method of claim 1, wherein the output comprises an indication that the face is detected in the image.

7. The method of claim 1, wherein the output comprises an assessed pose of the face in the image and an assessed distance from the camera of the face in the image.

8. A device, comprising:
a camera;
an illuminator;
a memory configured to store program instructions; and
a processor configured to execute the program instructions and to cause the device to:
capture at least one image using the camera, wherein the at least one image comprises an image captured while illuminating subjects in the image with the illuminator;
encode the at least one image to generate feature vectors defining features of subjects in the image in a feature space;
assess the generated feature vectors in the feature space to detect a face in the image, wherein at least some part of the face is present in the image, and wherein the face is detected regardless of an orientation of the face with respect to the camera;
form a bounding box around the face detected in the image, wherein, if a portion of the face detected is located outside an image boundary, the bounding box is formed around the at least some part of the face detected to be present in the image; and
provide an output comprising the bounding box formed for the detected face in the image.

9. The device of claim 8, wherein the camera comprises an infrared sensor.

10. The device of claim 8, wherein the program instructions comprise classifying parameters determined during a training process, and wherein the processor is configured to execute the program instructions and to cause the device to assess the generated feature vectors using the classifying parameters.

11. The device of claim 8, wherein the processor is further configured to execute the program instructions and to cause the device to operate a facial recognition process using the bounding box formed for the detected face in the image.

12. The device of claim 8, wherein the illuminator comprises a flood infrared illuminator.

13. The device of claim 8, wherein the processor is configured to form the bounding box around the face detected in an image captured with any exposure in a range set by exposure limits of the camera on the device.

14. A method, comprising:
capturing at least one image using a camera located on a device, the device comprising a computer processor and a memory, wherein the at least one image comprises an image captured while illuminating subjects in the image with an illuminator located on the device;
encoding the at least one image to generate feature vectors defining features of subjects in the image in a feature space, wherein an exposure in the at least one image is in an exposure range set by exposure limits of the camera on the device;

assessing the generated feature vectors in the feature space to detect a face in the image, wherein at least some part of the face is present in the image;

forming a bounding box around the face detected in the image; and providing an output, the output comprising the bounding box formed for the detected face in the image.

15. The method of claim 14, wherein the at least one image is captured in challenging lighting conditions.

16. The method of claim 14, wherein the computer processor comprises a multi-scale convolutional neural network module.

17. The method of claim 14, wherein assessing the generated feature vectors to detect the face in the image comprises determining the feature vectors that represent the face in the image.

18. The method of claim 17, wherein forming the bounding box comprises forming the bounding box around the feature vectors determined to represent face in the image.

19. The method of claim 14, wherein assessing the generated feature vectors to detect the face in the image comprises classifying the feature vectors to determine the feature vectors that represent the face in the image.

20. The method of claim 14, wherein the output comprises an indication that the face is detected in the image.

* * * * *